Figure 1:
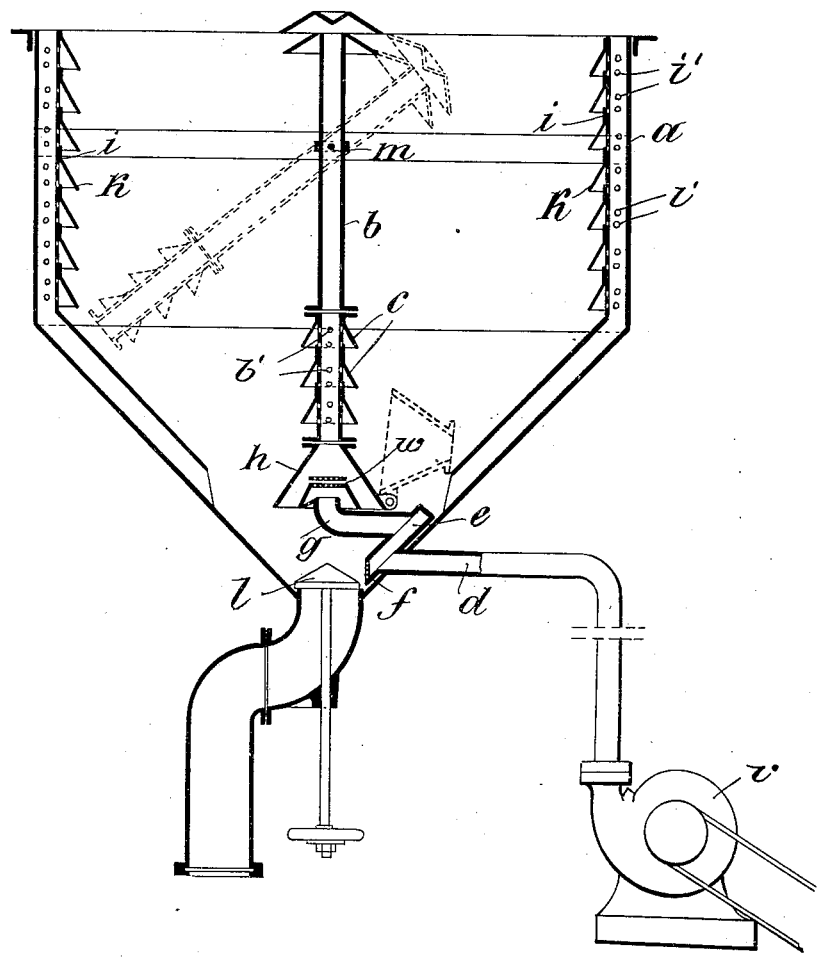

O. WINDE.
APPARATUS FOR STEEPING GRAIN.
APPLICATION FILED APR. 4, 1910.

1,042,739.

Patented Oct. 29, 1912.
2 SHEETS—SHEET 1.

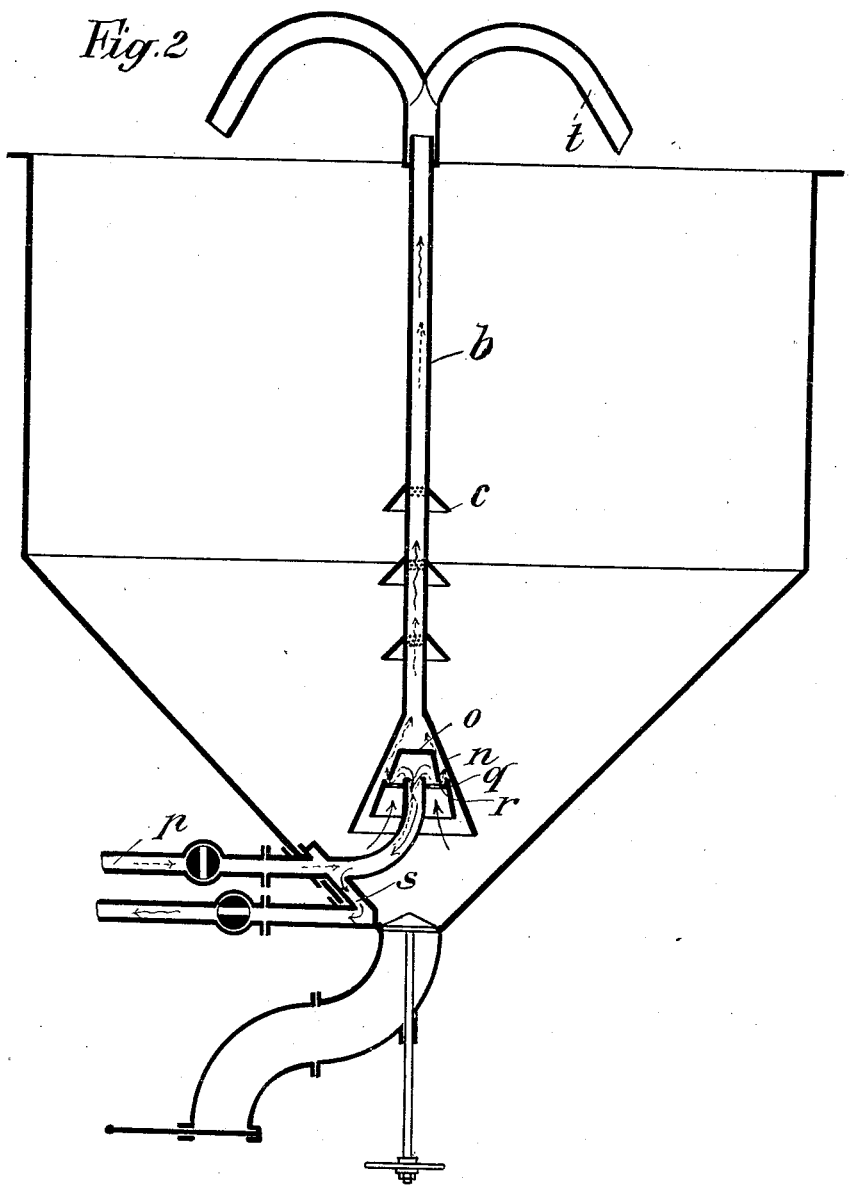

UNITED STATES PATENT OFFICE.

OSWALD WINDE, OF LUTZSCHENA-LEIPZIG, GERMANY.

APPARATUS FOR STEEPING GRAIN.

1,042,739. Specification of Letters Patent. Patented Oct. 29, 1912.

Application filed April 4, 1910. Serial No. 553,335.

*To all whom it may concern:*

Be it known that I, OSWALD WINDE, a subject of the Emperor of Germany, residing at Lutzschena - Leipzig, Germany, have invented certain new and useful Improvements in Apparatus for Steeping Grain, of which the following is a specification.

The steeping of barley, wheat and other grain which is treated for the manufacture of malt, is now usually carried out in the following manner: The material to be steeped is introduced into the water contained in the steeping tank, such water being suitably prepared if necessary, and left there for several days according to requirements. The water is, however, periodically removed or renewed. After each discharge of the water, the material to be steeped remains for some time without water in the tank without any treatment.

The above process has several disadvantages. During the discharge of the water, the material, more particularly if it is in deep layers, settles down very firmly. The consequence is that a comparatively large quantity of water adheres to the grains and remains in the spaces between them, so that a free access of oxygen to the interior of the grains is prevented. The injurious gases such as carbon dioxid, and gases of unpleasant smell, which collect between the grains during the steeping process, cannot escape when fresh water is being supplied, it becomes mixed with the old residue, whereby manifestly its action, as well as that of oxygen, on the material is considerably weakened. Moreover, owing to the residual water and to the action of the products of oxidation formed, more particularly when a long time elapses between the discharge of the water and the supply of fresh water, the material becomes heated, inducing an irregular steeping of the grains and an unfavorable action on the subsequent growth, which results in a reduced yield of extract. It is moreover old to ventilate the material during steeping, chiefly with a view to insuring a uniform growth during the subsequent germinating process, but the above explained disadvantages of the steeping process as hitherto practised could not and were not intended to be obviated by the same.

According to my invention, the disadvantages in question are obviated by drawing off the injurious gases after each discharge of the steeping water, without removing the grain from the tank or in any way re-laying it, the grain in the steeping tank itself being dried and an injurious heating of the same during the steeping process being avoided by exhausting the moisture. If after the drying in question, fresh water is supplied, it exercises a very favorable action on the grains in such manner that the oxygen supplied to the grain by the entering air and by the water, after the removal of the injurious products of oxidation which remained, the said air and water acting in a more energetic manner on the grains which have become dry. After the steeping has been completed, the material is dried in a well-known manner.

Two constructions of the apparatus embodying my invention are illustrated by way of example in the accompanying drawing.

Figure 1 represents a vertical section of my apparatus, and Fig. 2 a similar view of a modified form thereof.

The steeping tank is marked $a$ (Fig. 1). In the central axis of the same is arranged a pipe $b$ perforated at its bottom portion and having secured to it roof-shaped plates $c$. Into the bottom portion of the tank $a$ opens a pipe $d$ which leads to a fan $v$. To the pipe $d$ is connected a pipe $e$ closed at one end by a perforated plate $f$ and passing at the other end into a pipe $g$ leading under a cap or hood $h$. On the cap in question is arranged the pipe $b$. The lateral walls are also provided with pipes $i$ partly perforated and provided with roof or hood-shaped caps $k$. These pipes also lead to the lowest portion of the steeping tank. In the latter is arranged in the well known manner the valve $l$ for discharging the steeped grain. Owing to the arrangement of the pipes with the caps $c$ $k$ $h$, the whole of the grain to be steeped, is loosened. As soon as the water has been discharged, the fan is started. It draws air through the pipes $b$ $i$. The air in question can then pass through the perforated pipes into the grain and dry the same. The moisture together with the carbonic acid, etc., is drawn off by the fan at the lowest point of the steeping tank through the screen or sieve $f$. It will be noted that the perforations $b'$ and $i'$ in the ventilating pipes $b$ and $i$ are arranged under the hood-shaped caps or fenders, $c$ and $k$, respectively. Thereby a packing of the grain around and against the perforations is prevented and a perfect ventilation assured.

In order to enable the steeping apparatus to be easily cleaned, the pipe *b* is suspended to a pin *m* and can be turned about the said pin as shown in dotted lines in Fig. 1. The cap *h* can also be folded.

Fig. 2 shows a modified construction. The conical extension *n* is mounted directly on the pipe *b*. In the said extension is arranged at a certain distance the hood *o* into which air under pressure can be introduced by means of a pipe *p*. In the wall of the hood there is a slot *q*. The hood is further divided by a transverse partition *r* which can be also made of a perforated plate. From the pipe *p* branches a pipe *s* leading to an exhauster.

At each discharge of the steeping water, the moisture and the products of oxidation collect under the roof-shaped extension *c*, more particularly under the hood *o*, and are then drawn off upward by means of the pipe *b* as well as downward by means of the pipe *s*, until they have been completely removed. The steeping water is then introduced again, and compressed air admitted through the pipe *p* into the hood *o*. The said air passes in pulsation through the slot *q*, presses the barley with the steeping water through the pipe *b* upward and thus brings about a circulation of the barley and of the steeping water, as they are pumped over. In order to render complete circulation possible, the pipe *b* is provided with bent pipes *t*.

The arrows shown in full lines in the drawing, indicate the path of the moisture and of the products of oxidation during the exhausting of the same and of the gases drawn off through pipe *s*, while the arrows drawn in dotted lines indicate the path of the barley and of the steeping water raised by the compressed air.

What I claim as my invention and desire to secure by Letters Patent is:—

1. In an apparatus for steeping grain, a closed-bottom-tank, a ventilating pipe arranged in the same and provided at its bottom with a conical enlargement open at the bottom and with perforations along its intermediate portions, and fenders or cap-shaped projections extending over the said perforations, in combination with an air-feeding or exhausting hood fitting loosely in the said conical enlargement and provided with a slot opening into the enlargement and means for feeding or exhausting air to or from said hood.

2. Apparatus for use in steeping grain consisting in a tank having a closed-bottom and adapted to contain water and grain, means for withdrawing and renewing said water periodically, means comprising hollow bodies provided with perforations through which the products of oxidation together with the moisture are withdrawn from the grain after each discharge of the water, roof shaped projections or fenders on said hollow bodies extending over the perforations and insuring a loose arrangement of the grain and means for introducing air to dry the grain.

3. Apparatus for use in steeping grain consisting in a tank adapted to contain water and grain, means for withdrawing and renewing said water periodically, means comprising a hollow body having a conical end open at the bottom through which the products of oxidation together with the moisture are withdrawn in upward and downward direction from the grain, a conical hood with a slot therein fitting loosely in the conical end of said hollow body and means for introducing compressed air into said hood whereby said air passes between the hood and said conical end.

In testimony whereof I have signed my name to this specification in the presence of two subscribing witnesses.

OSWALD WINDE.

Witnesses:
 RUDOLPH FRICKE,
 PAUL REMECKE.

---

Copies of this patent may be obtained for five cents each, by addressing the "Commissioner of Patents, Washington, D. C."